United States Patent [19]

Rechter

[11] Patent Number: 4,780,142
[45] Date of Patent: Oct. 25, 1988

[54] HARD SETTING REFRACTORY COMPOSITION

[75] Inventor: Harold L. Rechter, Country Club Hills, Ill.

[73] Assignee: Chicago Fire Brick Company, Chicago, Ill.

[21] Appl. No.: 1,573

[22] Filed: Jan. 8, 1987

[51] Int. Cl.$^4$ .............................................. C04B 12/04
[52] U.S. Cl. ...................... 106/84; 501/128; 501/133
[58] Field of Search ................. 106/84; 501/94, 122, 501/127, 133, 128

[56] References Cited

U.S. PATENT DOCUMENTS

| | | | |
|---|---|---|---|
| 3,067,050 | 12/1962 | Miller, Jr. | 501/128 |
| 3,075,848 | 1/1963 | Davies et al. | 106/84 |
| 3,121,640 | 2/1964 | Miller, Jr. | 501/128 |
| 3,498,235 | 3/1970 | Martinet | 501/121 |
| 3,652,307 | 3/1972 | Bakker | 501/128 |
| 3,841,884 | 10/1974 | Farris et al. | 501/129 |
| 4,093,470 | 6/1978 | Cherry | 501/89 |
| 4,093,471 | 6/1978 | Greig | 106/99 |
| 4,149,899 | 4/1979 | Crookston | 501/128 |
| 4,501,830 | 2/1985 | Miller et al. | 523/401 |
| 4,506,025 | 3/1985 | Kleeb et al. | 501/124 |

FOREIGN PATENT DOCUMENTS

| | | | |
|---|---|---|---|
| 467555 | 8/1950 | Canada | 501/133 |
| 1964513 | 11/1970 | Fed. Rep. of Germany | 501/127 |
| 55-116658 | 9/1980 | Japan | 501/133 |
| 56-78476 | 6/1981 | Japan | |

OTHER PUBLICATIONS

Norton Refractories (1949), p. 148, Ref. 149 is Br. 276016 of 1927 n.g.

*Primary Examiner*—Steven Capella
*Attorney, Agent, or Firm*—Burmeister, York, Palmatier, Hamby & Jones

[57] ABSTRACT

Novel compositions are disclosed for the manufacture of gunning mixes and strong castable products for use as monolithic refractory and construction materials which may contain no lime bearing cements. Bonding is based on the setting reaction of fumed silica with an alkali metal silicate preferably a particulate sodium or potassium silicate that slowly dissolves in water such as an anhydrous sodium silicate of $SiO_2:Na_2O$ molar ratio of 1:1 to 4:1; or an anhydrated potassium silicate having an $SiO_2:K_2O$ molar ratio of 3:1, or a hydrated sodium silicate having an $SiO_2:Na_2O$ molar ratio of 3:1. Setting and mechanical characteristics allow this class of castable and gun mixes to be placed more rapidly into service since the time required for curing is much less. Although initial set strengths are not as high as those of conventional castables, very high strengths can be made to occur shortly after setting by heating. The addition of sodium hexametaphosphate was found to be highly beneficial to working and handling characteristics.

13 Claims, No Drawings

HARD SETTING REFRACTORY COMPOSITION

BACKGROUND OF THE INVENTION

The invention relates to hard setting refractory compositions and especially to rapid hard setting castable refractory compositions comprising fumed silica and a refractory material, such as one containing alumina, which when mixed with water will set to a hard mass at normal outdoor temperatures without any calcareous cementitious material being present in the composition.

Calcareous cements that contain fumed silica and are rapid setting are known as shown in Miller et al U.S. Pat. No. 4,501,830. Also, U.S. Pat. No. 4,506,025 discloses a castable silica brick composition containing fumed silica, silica and portland cement. This composition is relatively slow setting and contains undesirable calcium oxide compounds. Japanese Patent No. 1981-78476 shows a similar castable composition based on the coagulation of superfine silica powder with the Ca ions of Portland cement.

U.S. Pat. No. 3,121,641 discloses a castable composition containing alumina and fumed silica and U.S. Pat. No. 3,067,050 discloses a gunning mixture containing alumina and fumed silica. However, these compositions do not set quickly to a hard set, and must be given a lengthy curing and then fired to obtain suitable strength and hardness.

SUMMARY OF THE INVENTION

The present invention is based on my discovery that alkali metal silicates with fumed silica and refractory material when mixed with water will set to a hard mass at normal atmospheric temperatures and even lower. The alkali metal silicates act as active reagents or accelerators to initiate and speed up the hardening action of the fumed silica in such compositions. They are effective in such small quantities as 0.2-5% of the mixture.

The preferred alkali metal silicates for use in casting compositions and other purposes that require more time than flash setting are the particulate alkali metal silicates that have a rate of solution in water less than that of hydrated sodium silicate having a molar ratio of $SiO_2$:$Na_2O$ of 1:1. This is because the setting time depends upon the rate of solubility. The anhydrous alkali metal silicates dissolve with more difficulty than the hydrated silicates and the silicates containing more alkali metal in the molecule dissolve more readily.

Suitable alkali metal silicates that do not produce a very rapid or flash setting composition and that can be uniformly mixed before setting include the particulate anhydrous sodium silicates having a molar ratio of $SiO_2$:$Na_2O$ of at least 1 to 1, preferably 2:1 to 4:1, particulate hydrated sodium silicates having a molar ratio of $SiO_2$: $Na_2O$ of at least 3:1, preferably 3:1 to 4:1, and particulate anhydrous potassium silicate having a molar ratio of $SiO_2$: $K_2O$ of at least 3:1.

Compositions containing fumed silica and liquid sodium silicates or hydrated sodium silicates having a molar ratio of $SiO_2$: $Na_2O$ of 1:1 have a very rapid or flash set and are impractical for most uses since they cannot be uniformly mixed before setting, but they can be used for filling holes, patching and the like.

The binding mechanism of alkali metal silicates with fumed silica can be employed with a great variety of formulations, preferably those containing alumina such as bauxites, and high alumina materials. Other material used in refractory applications such as calcined clay, silicon carbide, spinel, and zircon may be used. This includes formulations for placement by gunning and shotcreting application as well as by casting.

One advantage of this invention is that it is not necessary to use calcareous cements or lime.

It is also an object of this invention to provide refractory cast products that can be installed with lesser concern for curing procedures and put into service soon after hardening.

It is a further object of this invention to provide more predictable and reliable properties than is often the case with complex calcium aluminate cement systems.

A preferred composition to harden both cast and gunning materials comprises fumed silica in from 3-30% of the total refractory composition, powdered anhydrous sodium silicate with a silica to soda ratio of 1:1 to 4:1 in the range of 0.2-5% of the total mix, and a major amount of refractory aggregate comprising alumina. When the anhydrous sodium silicate is replaced with hydrated sodium silicate the molar ratio of $SiO_2$: $Na_2O$ for similar results should be 3:1 to 4:1. With anhydrous potassium silicate the molar ratio of $SiO_2$: $K_2O$ should be at least 3:1. With poured or vibrated castables 0.1 to 1.0% by weight sodium hexametaphosphate is helpful.

Castables and gunning formulations may be made without the inclusion of calcarious cementitious components using fumed silica as the sole binder. This is made feasible by my discovery that the addition of alkali metal silicate reagents to the fumed silica promotes a hardening reaction even without CaO similar to that common to Portland cement products. For casting, the dry mix is tempered with clean water and can be poured and vibrated into place or troweled, in the normal manner. However, since these are relatively dense due to the low water requirement, they must be mixed a few minutes longer and are somewhat stickier on pouring. When placed they should not be covered, misted with water, sealed, or in any way prevented from drying out. Gunning requires no special procedures. After the forms are stripped the cast or gunned products can be allowed to dry out, even by the application of mild heat, and allowed to set. Shortly after setting these products, unlike Portland cement products, can be fired or otherwise uniformly exposed to high heat without harm to the products.

DESCRIPTION OF THE PREFERRED EMBODIMENT

Several examples of formulations which embody this invention are given in the examples to follow:

EXAMPLE 1

A refractory castable was formulated as follows:

| | |
|---|---|
| 35.4% | Mulcoa 60 —4 mesh |
| 26.6% | Bauxite —10 mesh |
| 17.7% | Fused alumina —325 mesh |
| 8.9% | Calcined alumina —325 mesh |
| 11.1% | Fumed silica (spherical particles average 0.15 microns) |
| 0.3% | Sodium Silicate —200 mesh (Portil N) |
| 0.1% | Sodium hexametaphosphate |

Mulcoa 60 is a calcined kaolin product of the C. E. Minerals Company containing about 60% alumina. The bauxite may be South American, Chinese, or a blend of calcined bauxites.

The sodium silicate of the above example (Portil N) was in the weight ratio of $SiO_2$ to $Na_2O$ of 3.22:1, and is a hydrated sodium silicate of about 14% water of hydration. Henkel KGaA in Germany markets Portil N. The 0.3% level of sodium silicate allows adequate working time to cast the material. Larger grain size reagents having this ratio are also available. Philadelphia Quartz Company's SS-20 and SS-65 are anhydrous sodium silicates of $SiO_2$: $Na_2O$ ratio of 3.2:1 that can be used in higher levels of sodium silicate because of their lower reactivity. In combination or singly the range of silicate powders can preferably span from 0.2% to 1.5% of castables and up to 5% of gun mixes. The limitation on the latter is to avoid a high level of alkali inclusion and a rapidity of set which can complete clean up procedures.

To mix, $\frac{1}{2}$ to $4\frac{1}{2}$% water can be put into the mixer first or added to the dry castable. A minimum of 5 minutes mixing time is used to develop a casting consistency. Internal and external vibrators are both useful for good placement. However, the high densities obtained with these low water requirements make external vibration more effective when practical. Shortly after the material sets, normally within an hour, forms can usually be removed. At this point it can be gently heated or placed in an oven for drying and then uniformly heated at high temperatures and even fired. Strong direct flames should be avoided until considerable drying has taken place, or until 48 hours have elapsed if no other source of heat has been used.

EXAMPLE 2

A series of castables were formulated as follows:

|  | 1 | 2 | 3 | 4 |
|---|---|---|---|---|
| Mulcoa 47 −10 mesh | 9 lbs | 9 lbs | 9 lbs | 9 lbs |
| Fused alumina −325 mesh | 4 lbs | 4 lbs | 4 lbs | 4 lbs |
| Fumed silica | 2 lbs | 2 lbs | 2 lbs | 2 lbs |
| Calcined alumina −325 mesh | 3 lbs | 3 lbs | 3 lbs | 3 lbs |
| Raw kyanite −35 mesh | 2 lbs | 2 lbs | 2 lbs | 2 lbs |
| Sodium silicate −200 mesh | 1 oz | 1 oz | 1 oz | 1 oz |
| Sodium hexametaphosphate | $\frac{1}{4}$ oz | $\frac{1}{2}$ oz | 1 oz | 2 oz |
| Water | 19 oz | 19 oz | 19 oz | 19 oz |
| Physical data 1000° F.: |  |  |  |  |
| Bulk Density lbs/cu ft | 150 | 153 | 146 | 147 |
| Cold crush strength psi | 3500 | 3800 | 2800 | 3400 |

This data shows the effect of varying sodium hexametaphosphate (SHMP). The level of Test 2 was optimal, about 0.2%. The sodium silicate in all the above tests was in powder form and had a weight ratio of $Si_2O$ to $Na_2O$ of approximately 3.22 to 1.

EXAMPLE 3

A blend was made of 9 lbs. of calcined Missouri flint clay, −1/16 inch, 4 lbs. of −325 mesh fused alumina fines, 2 lbs. of fumed silica, 2 lbs. of −35 mesh raw kayanite, and $\frac{1}{2}$ oz. SHMP. To this was added several levels of −200 mesh hydrated sodium silicate (Portil N), of a weight ratio of $Sio_2:Na_2O$ of 3.22:1 (approximate molar rate of 3:1). All were cast with 19–20 oz. water (about 6%). Results were as follows:

| Wt Portil N oz | % | Work Time min | 1000° F. Cold Crush Strength psi |
|---|---|---|---|
| 0 | 0 | No set | — |
| $\frac{1}{2}$ | 0.16 | Skin, no hard set | — |
| $\frac{3}{4}$ | 0.23 | 130 | — |
| 1 | 0.31 | 18 | 3800 |
| 2 | 0.62 | 8 | 6400 |
| 3 | 0.94 | 7 | 7400 |
| 4 | 1.25 | Flash set | — |

The flash set can be avoided by adding most of the Portil N at the end of the mix just prior to casting. Coarser sized silicates such as Philadelphia Quartz' SS-20 and SS-65 can be used initially but preferably not above 1.5% in most cases or added just prior to casting. Levels above 0.5% of any of the powders are not recommended as initial blends with formulations of 85% alumina and above.

Formulations containing graphite, silicon carbide, chromium oxide, zirconia, and zircon have all been made and are usable with this method of bonding. Silicon metal additions are useful with graphite and silicon carbide to promote higher strengths and oxidation resistance. However, the use of powdered metals and even iron ball milled raw materials can produce hydrogen gas in amounts sufficient to be of concern.

EXAMPLE 4

The following formulation is an example of a gunning mix using this novel bonding system.

| 15 parts | Calcined Bauxite $\frac{1}{4}$ by 1/16 inch |
|---|---|
| 65 parts | Calcined Bauxite −1/16 inch |
| 5 parts | Fumed silica |
| 10 parts | Raw kyanite −100 mesh |
| 5 parts | Ball clay |
| 1 part | Sodium silicate (Portil N) |

This product gunned with little rebound or dusting and required less water than conventional gunning materials. A higher level of silicate accelerator is used than with ordinary castables to promote fast hardening to prevent any tendency to slump. The practical limit is at about 5% to avoid excessive sodium content (a flux). SHMP is not needed in the gunning mixes. Many other aggregates can be used, such as calcined clays, fused and tabular aluminas, etc. Additives such as carbons, silicon carbide, chrome oxide, zirconia and zircon can be advantageous in this system. Metal powders such as silicon are beneficial to properties but may produce hydrogen.

The level of fumed silica was also investigated. A practical lower limit of 5% produces good strengths and reasonably low water requirements, and is preferred for high alumina castables, and in gun mixes (where higher levels are dust producing). The 10% level has been found overall to be adequate and optimal in most cases for castables. Levels of 15–25% impart an undesirable stickiness and water requirements climb. Silica contents may be rather high at the higher levels. However, the entire range from about 3% to 30% fumed silica is viable for this bonding mechanism.

Fine powdered sodium silicates most useful have roughly 63% $Sio_2$, 19% $Na_2O$, and 18% $H_2O$ corresponding to a molar ratio of $SiO_2$: $Na_2O$ of approximately 3:1. The two coarser silicates, namely Philadelphia Quartz Company's SS-20 and SS-65, are essentially anhydrous, containing roughly 75% $SiO_2$ and 23% $Na_2O$. As stated, these also work but preferably at higher concentration levels.

Compositions were tested with potassium silicate molar ratio of $SiO_2$: $K_2O$ of about 3:1 (Portil Potassium) from Henkel $KG_2A$ containing 56% $SiO_2$, 285 $K_2O$, and 16% $H_2O$). In this hydrated form this reagent is too readily soluble and caused an almost instant setting reaction. This material was dehydrated by calcining at about 1300° F. for about 18 hours and grinding to −65 mesh. This material was substantially free of all water. This treatment produced a successful result, as described in the following example.

EXAMPLE 5

A blend of 12 lbs. of −¼ inch and down of Mulcoa 47 brand calcined clay, 2 lbs. of fumed silica, 4 lbs. of −325 alumina fines, 2 lbs. of −100 mesh kyanite, ½ oz. of SHMP, and 1¼ oz. of dehydrated potassium silicate, −65 mesh, was mixed with 1 lb. 4 oz. water. This was a good working castable. The working time prior to an initial set was about 8 minutes, somewhat less than that obtained with the sodium compound. Dried cold crush strengths after about 20 hours at 220° F. averaged 3800 psi.

Anhydrous potassium silicate of a weight ratio of $SiO_2$ to $K_2O$ of 2:1 (molar ration of 3:1) is manufactured by the Philadelphia Quartz Company as Kasil SS Powder, and gives the same results as the above dehydrated material.

The following shows the results of studies on the effect of reagent ratios (and corresponding molar ratios) of $SiO_2$:$Na_2O$ and $SiO_2$:$K_2O$ with and without hydration of the silicates on the working time for mixing with water to obtain a set.

| Calcined clay (MULCOA 47) 3 × 8 mesh | 7 lbs. |
|---|---|
| Calcined clay (MULCOA 47) −8 mesh | 5 lbs. |
| Fumed Silica | 2 lbs. |
| Fused alumina fines −325 mesh | 4 lbs. |
| Raw kyanite −100 mesh | 2 lbs. |
| Sodium hexametaphosphate | ½ oz. |

To this was added several alkali silicate additions as shown in the following table with differing $SiO_2$:$Na_2O$ and $K_2O$ ratios both hydrated and anhydrous. The results are indicated.

| Silicate | Wt. Ratio | Addition | Hydrate | Working Time | Cold Crush (after 230° F.) |
|---|---|---|---|---|---|
| Sodium | 3.2:1 | 1 ounce | Yes | 30 min. | 3800 psi |
| | 3.2:1 | 3 ounces | No | 60 min. | 7000 psi |
| | 2:1 | 1 ounce | Yes | Flash set | — |
| | 2:1 | 1 ounce | No | 90 min. | 6300 psi |
| | 2:1 | 2 ounces | No | 12 min. | 7700 psi |
| | 1:1 | 1 ounce | Yes | Flash set | — |
| | 1:1 | 2 ounces | No | 15 min. | 2200 |
| Potassium | 2:1 −150 mesh | 32 grams | Yes | Flash set | — |
| | 2:1 −40 mesh | 1 ounce | Yes | 4 min. | 3650 psi |
| | 2:1 | 34 grams | No | 8 min. | 3700 psi |
| | 2.5:1 | 1 ounce | No | 90 min. | 3700 psi |
| | 2.5:1 | 2 ounces | No | 20 min. | 6700 psi |
| | 2.5:1 | 4 ounces | No | 5 min. | 6200 psi |

All ratios tested can work. In the hydrated form the lower ratios materials would set too rapidly for casting. They could all be used for gunning. All of the castables were tested with about 6% water. The silicates were all in powder form.

The percent amounts given in the specification and claims are all weight percents.

The mesh amounts are Tyler screen sizes.

The ratios given in the specification and claims are molar ratios except where specifically indicated as weight ratios. The weight and molar ratios for the sodium silicate are substantially the same and the 2:1 weight ratio for the potassium silicate is approximately a 3:1 molar ratio.

The term fumed silica is also known in the trade as volatilized silica, arc silica and silica fume. A typical analysis including particle size of silica fume is shown in U.S. Pat. No. 4,310,486.

What is claimed is:

1. A refractory composition which when mixed with water can be poured or vibrated in place and will set to a hard mass at normal atmospheric temperatures, consisting essentially of an alumina bearing aggregate, fumed silica and a particulate alkali metal silicate selected from the group consisting of anhydrous sodium silicate having a molar ratio of $SiO_2$:$Na_2O$ of 1:1 to 4:1, hydrated sodium silicate having a molar ratio of $SiO_2$: $Na_2O$ of 3:1 to 4:1 and anhydrous potassium silicate having a molar ratio of $SiO_2$:$K_2O$ of at least 3:1, and mixtures thereof.

2. A composition in accordance with claim 1 in which the alkali metal silicate is present in 0.2% to 1.5% of the composition.

3. A composition in accordance with claim 2 in which the alumina bearing aggregate is in major amount and the fumed silica is in minor amount.

4. A composition, in accordance with claim 2, in which the alumina bearing aggregate is alumina.

5. A composite in accordance with claim 2 in which the alumina bearing aggregate is bauxite.

6. A composition in accordance with claim 2 in which the alumina bearing aggregate is calcined clay.

7. A composition in accordance with claim 3 in which the fumed silica is present in 3-30% by weight of the refractory composition and the alkali metal silicate is in 0.2 to 1.5% by weight of the composition.

8. A castable composition in accordance with claim 2 in which the composition is dispersed in water and water is preset in amount such as to make the composition pourable and settable to a hard mass.

9. A composition in accordance with claim 2 which is substantially free of calcium oxide or calcarous cement.

10. A composition in accordance with claim 7 in which also contains sodium hexametaphosphate in amount from 0.1 to 1.0% by weight of the composition.

11. A composition in accordance with claim 1 in which the alkali metal silicate is essentially anhydrous sodium silicate in a $SiO_2$:$Na_2O$ molar ratio of 3:1.

12. In a refractory composition that sets hard at normal atmospheric temperature comprising a refractory aggregate, fumed silica and an alkali metal silicate the improvement of having sodium hexametaphosphate present in 0.1 to 1.0% by weight of the composition.

13. A composition in accordance with claim 1 in which the anhydrous sodium silicate has a molar ratio of $SiO_2$: $Na_2O$ of 2:1 to 4:1.

* * * * *